(No Model.)
W. P. HAMLIN.
BEE TRAP.
No. 340,114. Patented Apr. 20, 1886.
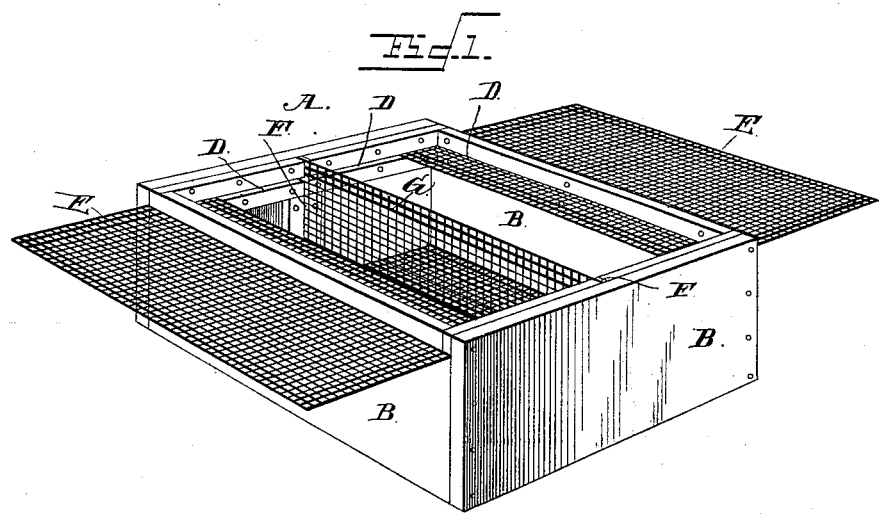
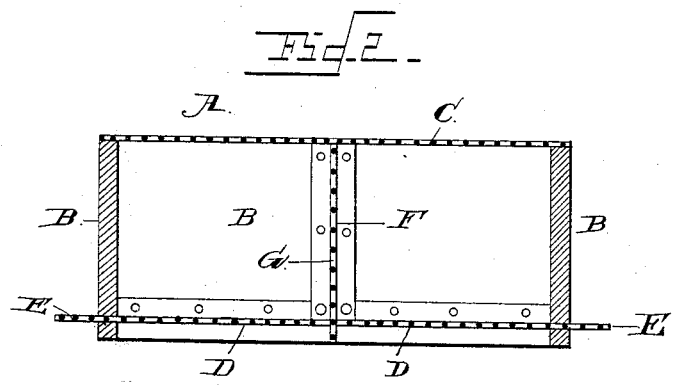

UNITED STATES PATENT OFFICE.

WILLIAM P. HAMLIN, OF ROGERS, ARKANSAS.

BEE-TRAP.

SPECIFICATION forming part of Letters Patent No. 340,114, dated April 20, 1886.

Application filed December 22, 1885. Serial No. 186,475. (No model.)

*To all whom it may concern:*

Be it known that I, WILLIAM P. HAMLIN, a citizen of the United States, residing at Rogers, in the county of Benton and State of Arkansas, have invented a new and useful Improvement in Bee-Traps, of which the following is a specification, reference being had to the accompanying drawings.

My invention relates to an improvement in bee-traps; and it consists in the peculiar construction and combination of devices that will be more fully set forth hereinafter, and particularly pointed out in the claim.

My invention is particularly adapted to be used in connection with a bee-hive having a hood-chamber and a communicating removable honey-chamber, such as shown in Letters Patent of the United States No. 330,478, granted to me November 17, 1885, and the object of my invention is to enable the swarm to be caught and divided, either for the purpose of starting a new colony or to capture the queen-bee and prevent the bees from swarming.

In the drawings, Figure 1 is a perspective view of a bee-trap embodying my invention with the slides extended. Fig. 2 is a transverse sectional view of the same with the slides closed.

The hive to be used in connection with my improved bee-trap may be of any preferred construction, but must contain a brood-chamber and a communicating removable honey-chamber.

A represents the trap, which has sides B, forming a rectangle. C represents the top, which is made of wire-gauze. In the lower edges of opposing sides of the trap are cut grooves D, in which work extensible slides E, which are made of wire-gauze and form the bottom of the trap. Vertical grooves F are also made in opposing sides of the trap between the meeting edges of the slides E, and in the said grooves a partition-slide, D, is adapted to be inserted, the said slide being also made of wire-gauze.

When it is desired to take the hive apart for the purpose of collecting the honey, dividing the bees into two or more swarms, or to exterminate moths, the bee-keeper first drives the bees from the honey-chamber into the brood-chamber by means of a "smoker," when the honey in the honey-chamber is removed and the trap with its slides E extended is placed over the openings between the brood and honey chambers. The bees are then driven from the brood-chamber into the trap, the slides E are closed, and the trap containing the bees is removed.

In order to separate the bees to keep them from swarming and to stock a new hive, one-half of the comb in the brood-chamber containing one-half the young brood and a queen-cell is removed and placed in a new hive. The bees in the trap are then divided by slipping in the slide G, and the queen-bee and half of the bees are put back in the old hive, when the bees will go to work immediately as though nothing had happened. The remaining half of the bees are introduced into the new hive containing a portion of the young brood and a queen-cell.

I have hereinbefore described the top and slides of the trap as being made of wire-gauze. This is used in order to admit light into the trap to render the queen-bee readily distinguishable; but it is evident that the slides may be made of glass or other suitable transparent material without departing from the spirit of my invention.

Having thus described my invention, I claim—

The bee-trap herein described, consisting of the body portion having the two sliding bottom pieces, a suitable cover, and a vertical sliding partition, substantially as described.

In testimony that I claim the foregoing as my own I have hereto affixed my signature in presence of two witnesses.

WILLIAM P. HAMLIN.

Witnesses:
A. LOWRY,
TOM C. STRICKLAND,